United States Patent
Corcodel et al.

(10) Patent No.: US 11,794,350 B2
(45) Date of Patent: Oct. 24, 2023

(54) INTERACTIVE TACTILE PERCEPTION METHOD FOR CLASSIFICATION AND RECOGNITION OF OBJECT INSTANCES

(71) Applicant: Mitsubishi Electric Research Laboratories, Inc., Cambridge, MA (US)

(72) Inventors: Radu Ioan Corcodel, Quincy, MA (US); Siddarth Jain, Cambridge, MA (US); Jeroen van Baar, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 306 days.

(21) Appl. No.: 17/077,937

(22) Filed: Oct. 22, 2020

(65) Prior Publication Data
US 2022/0126453 A1    Apr. 28, 2022

(51) Int. Cl.
*G05B 19/04* (2006.01)
*B25J 9/16* (2006.01)
(Continued)

(52) U.S. Cl.
CPC ............ *B25J 9/1697* (2013.01); *B25J 9/163* (2013.01); *B25J 9/1612* (2013.01); *B25J 9/1694* (2013.01);
(Continued)

(58) Field of Classification Search
CPC ........ B25J 9/1697; B25J 9/1612; B25J 9/163; B25J 9/1694; B25J 13/08; B25J 13/084;
(Continued)

(56) References Cited

U.S. PATENT DOCUMENTS

| 10,981,272 | B1* | 4/2021 | Nagarajan | B25J 9/1669 |
| 2016/0098151 | A1* | 4/2016 | Kim | G06F 3/0412 |
| | | | | 345/174 |

(Continued)

OTHER PUBLICATIONS

IEEE/RSJ International Conference on Intelligent Robotics and Systems on Oct. 11-15, 2009; title: "Object Identification with Tactile Sensors using Bag-of-Features" by ("Schneider"). (Year: 2009).*

(Continued)

*Primary Examiner* — Abby Y Lin
*Assistant Examiner* — Sohana Tanju Khayer
(74) *Attorney, Agent, or Firm* — Gennadiy Vinokur; Hironori Tsukamoto

(57) ABSTRACT

A controller is provided for interactive classification and recognition of an object in a scene using tactile feedback. The controller includes an interface configured to transmit and receive the control, sensor signals from a robot arm, gripper signals from a gripper attached to the robot arm, tactile signals from sensors attached to the gripper and at least one vision sensor, a memory module to store robot control programs, and a classifier and recognition model, and a processor to generate control signals based on the control program and a grasp pose on the object, configured to control the robot arm to grasp the object with the gripper. Further, the processor is configured to compute a tactile feature representation from the tactile sensor signals and to repeat gripping the object and computing a tactile feature representation with the set of grasp poses, after which the processor, processes the ensemble of tactile features to learn a model which is utilized to classify or recognize the object as known or unknown.

21 Claims, 12 Drawing Sheets

(51) Int. Cl.
*G06T 7/70* (2017.01)
*G06N 20/00* (2019.01)
*G06V 20/10* (2022.01)
*B25J 13/08* (2006.01)
*B25J 15/00* (2006.01)
*G01L 1/02* (2006.01)

(52) U.S. Cl.
CPC ............. *B25J 13/08* (2013.01); *B25J 13/084* (2013.01); *B25J 15/0033* (2013.01); *G01L 1/02* (2013.01); *G06N 20/00* (2019.01); *G06T 7/70* (2017.01); *G06V 20/10* (2022.01); *G05B 2219/39543* (2013.01); *G05B 2219/40553* (2013.01); *G05B 2219/40575* (2013.01); *G05B 2219/40625* (2013.01); *G06T 2207/20081* (2013.01)

(58) Field of Classification Search
CPC ........ B25J 15/0033; G01L 1/02; G06N 20/00; G06T 7/70; G06T 2207/20081; G06V 20/10; G05B 2219/39543; G05B 2219/40553; G05B 2219/40575; G05B 2219/40625
See application file for complete search history.

(56) References Cited

U.S. PATENT DOCUMENTS

| | | | |
|---|---|---|---|
| 2019/0176326 A1* | 6/2019 | Bingham | B25J 9/161 |
| 2020/0130193 A1* | 4/2020 | Takahashi | G06T 7/73 |
| 2020/0215685 A1* | 7/2020 | Jamali | B25J 9/1697 |
| 2020/0301510 A1* | 9/2020 | Birchfield | G01L 5/226 |
| 2021/0215510 A1* | 7/2021 | Ricks | G01D 5/145 |
| 2021/0283785 A1* | 9/2021 | Chen | B25J 9/1697 |

OTHER PUBLICATIONS

IEEE international conference on robotics and automation (ISRA) on May 26-30, 2015; title: "Localizing the object contact through matching tactile features with visual map" by ("Luo"). (Year: 2015).*

IEEE transactions on haptics, vol. 9, No. 2, Apr.-Jun. 2016; title "Single grasp object classification and feature extraction with simple robot hands and tactile sensors" by ("Spiers") (Year: 2016).*

IEEE International Conference on robotics and automation on May 3-8, 2010; title "Haptic object recognition using passive joints and haptic key features" by ("Gorges") (Year: 2010).*

Schneider et al. "Object Identification with Tactile Sensors using Bag of Features," Intelligent Robots and Systems, 2009, IROS. IEEE RSJ Conf On. Oct. 10, 2009. pp. 243-248.

* cited by examiner

INTERACTIVE TACTILE PERCEPTION METHOD FOR CLASSIFICATION AND RECOGNITION OF OBJECT INSTANCES

FIELD OF THE INVENTION

The present invention is related generally to a controller and a method for interactive robotic tactile perception method for classification and recognition of novel object instances.

BACKGROUND

Robotic manipulation has been evolving over the years from simple pick-and-place tasks, where the robot's environment is predominantly well structured, to dexterous manipulation where neither the objects nor their poses are known to the robotic system beforehand. Structured pick-and-place tasks leverage the artificially reduced task complexity and thus require minimal sensing, if any, for grasping operations. Dexterous manipulation on the other hand, must rely more heavily on sensing not only to confirm successful grasp attempts, but also to localize, distinguish and track graspable objects, as well as planning grasps autonomously. Typically, robotic manipulation systems rely on "classic" machine vision, e.g., depth cameras, LiDAR or color cameras, which require line-of-sight with the environment. Although some of the inherent vision problems can be mitigated by using multiple points of view, in-wrist camera systems, and visual servoing, the final stage of the grasp, i.e., physical contact, remains blind and open loop. More importantly, the state of the object after grasping and during manipulation is very difficult to estimate (for example, due to material properties).

A number of prior works have studied related tactile recognition problems, particularly with supervised learning. Some examples of such tactile perception problems include recognition of object instances, surface texture information, and stiffness properties. Prior work has focused on recognizing object instances, when the number/types of object classes are known a priori. In contrast, in this work we aim to recognize novel object instances with tactile manipulation in a setting where the robot has no a priori information about the number of classes and the associated object labels. Our work helps address the questions whether interaction with touch can provide significant information about novel object identity and whether the global geometry and appearance properties can be approximated with such information.

Several prior works have explored supervised learning with training datasets for classification of object categories using tactile sensing. Spiers et al. proposed a gripper hardware comprising of a simple two-finger under-actuated hand equipped with TakkTile barometric pressure sensors for performing object classification. They use a random forests (RFs) classifier to learn to recognize object instances based on training data over a set of objects. Schneider et al. identify objects with touch sensors installed in the fingertips of a manipulation robot using an approach that operates on low-resolution intensity images obtained with touch sensing. Such tactile observations are generally only partial and local views, similar as in our work. They adapt the Bag-of-Words framework to perform classification with local tactile images as features and create a feature vocabulary for the tactile observations using k-means clustering. Drimus et al. proposed a novel tactile-array sensor based on flexible piezoresistive rubber and present an approach for classification of several household objects. They represent the array of tactile information as a time series of features for a k-nearest neighbors classifier with dynamic time warping to calculate the distances between different time series.

More recently, deep learning-based approaches are also proposed for recognizing object instances with touch and vision. Lin et al. proposed a convolutional neural network (CNN) for cross-modality instance recognition in which they recognize given visual and tactile observations, whether these observations correspond to the same object. In their work, they use two GelSight sensors mounted on the fingers of a parallel jaw gripper. The GelSight tactile sensor provides high-resolution image observations, and it can detect fine surface features and material details using the deformable gel mounted above a camera in the sensor. Although their approach does not require specific class labels during training, it still needs a large dataset for training as with all deep learning-based methods. Researchers have also proposed supervised techniques for inferring object properties from touch. For example, Yuan et al. proposed estimating the hardness of objects using a convolutional neural network and the GelSight tactile sensor.

Other than the recognition problem, tactile sensing has also been utilized for improving robotic manipulation and grasping. Calandra et al. proposed a multimodal sensing framework that combines vision and touch to determine the utility of touch sensing in predicting grasp outcomes. They use a deep neural network (DNN) with inputs from RGB images from the front camera and the GelSight sensors in order to predict whether the grasping will be successful or not. Hogan et al. proposed a novel re-grasp control policy that makes use of tactile sensing for improving grasping with local grasp adjustments. In the next section, we discuss the tactile sensing hardware and the generation of tactile data.

SUMMARY OF THE INVENTION

The present disclosure provides a novel approach for classification of unseen object instances from interactive tactile feedback. Our proposed embodiment interactively learns a one-class classification model using 3D tactile descriptors, and thus demonstrates an advantage over the existing approaches, which require pre-training on objects. We describe how we derive 3D features from the tactile sensor inputs, and exploit them for learning one-class classifiers. In addition, since our proposed method uses unsupervised learning, we do not require ground truth labels. This makes our proposed method flexible and more practical for deployment on robotic systems. Furthermore, our proposed embodiment of the method demonstrates the utility of a low-resolution tactile sensor array for tactile perception that can potentially close the gap between vision and physical contact for manipulation. The proposed method can also utilize high-resolution camera-based tactile sensors.

The present disclosure proposes a method to classify novel objects based on tactile feedback, without the need of pre-training and ground truth labels for supervision. Our proposed embodiment of the method uses One-Class SVM to fit a set of features derived from grasp pressure maps acquired from interactive tactile manipulation on objects, and subsequently classify instances by interacting with the objects.

According to some embodiments of the present invention, a controller is provided for interactive classification and recognition of an object in a scene using tactile feedback. The controller may include an interface configured to transmit and receive the control, sensor signals from a robot arm, gripper signals from a gripper attached to the robot arm, tactile signals from sensors attached to the gripper and at least one vision sensor; a memory module to store robot control programs, and a classifier and recognition model; and a processor configured to generate control signals based on the control program and a grasp pose on the object, and configured to control the robot arm to grasp the object with the gripper, and wherein the processor is further configured to compute a tactile feature representation from the tactile sensor signals; the processor is configured to repeat gripping the object and computing a tactile feature representation with the set of grasp poses, after which the processor, processes the ensemble of tactile features to learn a model which is utilized to classify or recognize the object as known or unknown.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

Figure 1:
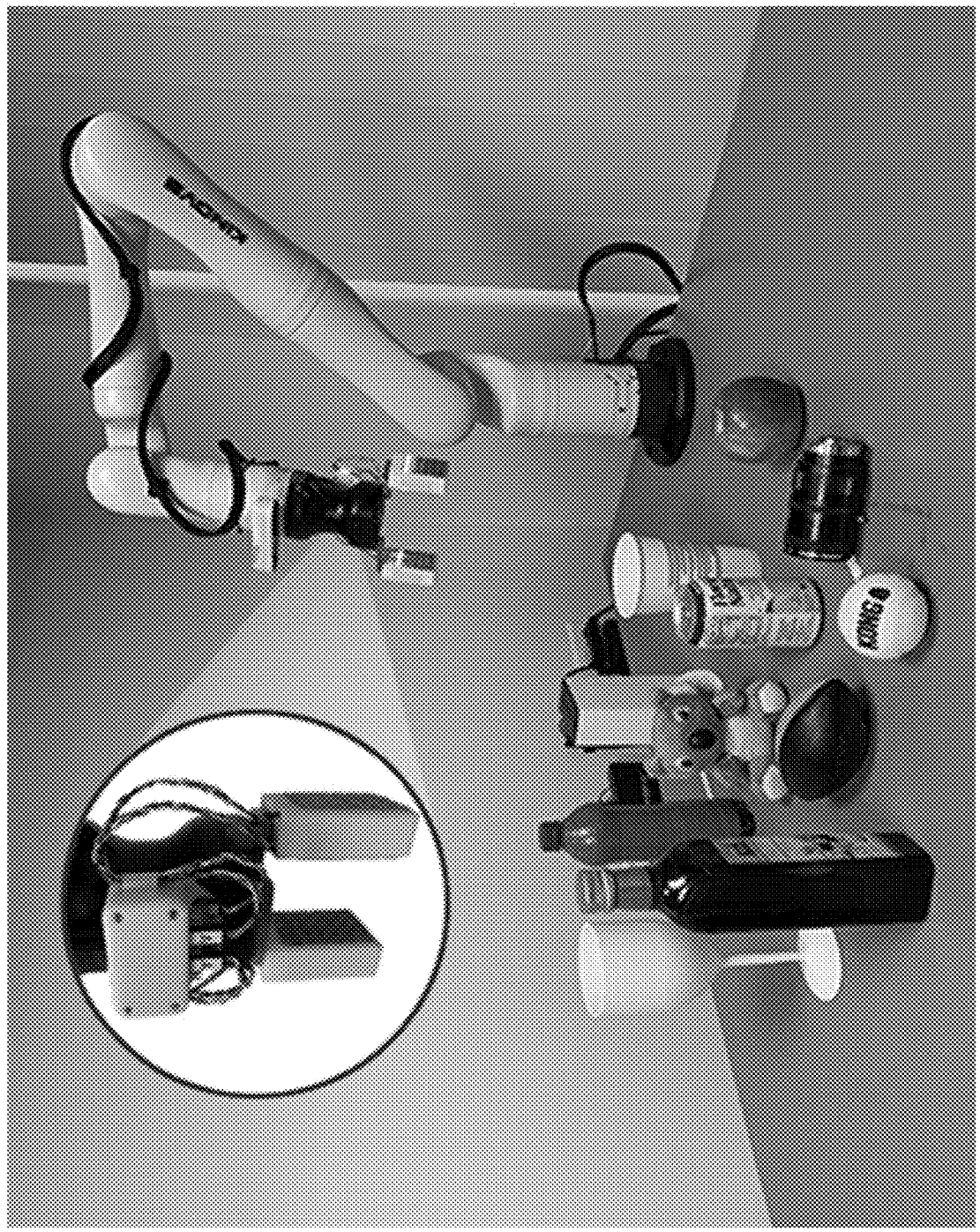
FIG. 1 shows the experimental setup for our interactive tactile-based classification and recognition.

Various embodiments of the present invention are described hereafter with reference to the figures. It would be noted that the figures are not drawn to scale and elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Robotic manipulation has been evolving over the years from simple pick-and-place tasks, where the robot's environment is predominantly well structured, to dexterous manipulation where neither the objects nor their poses are known to the robotic system beforehand. In some cases, a taxel short for tactile element, analogous to a pixel. Structured pick-and-place tasks leverage the artificially reduced task complexity and thus require minimal sensing, if any, for grasping operations. Dexterous manipulation on the other hand, must rely more heavily on sensing not only to confirm successful grasp attempts, but also to localize, distinguish and track graspable objects, as well as planning grasps autonomously.

Typically, robotic manipulation systems rely on "classic" machine vision, e.g., depth cameras, LiDAR or color cameras, which require line-of-sight with the environment. Although some of the inherent vision problems can be mitigated by using multiple points of view, in-wrist camera systems, and visual servoing, the final stage of the grasp, i.e., physical contact, still remains blind and open loop. More importantly, the state of the object after grasping and during manipulation is very difficult to estimate (for example, due to material properties).

Objects that may appear similar to an advanced vision system can differ completely in terms of their material properties. Tactile feedback can close the gap between vision and physical manipulation. There have been recent advancements in tactile manipulation and state-of-the-art approaches use vision-based tactile feedback using deformable gel mounted above a camera which provides high-resolution image observations of the grasped objects. Although effective, such sensors are usually bulky and may introduce computational overhead while processing high-resolution images. In this work, taking motivation from human fingertips which can account for roughly 100 taxels (tactile sensor cells) per square centimeter, we propose utilization of a low resolution tactile device based on barometric MEMS devices (Micro Electro-Mechanical System).

Object classification is an important task of robotic systems. Vision-based approaches require pre-training on a set of a priori known objects for classification. We propose instead to perform classification of novel objects based on interactive tactile perception, using unsupervised learning without any pre-training. This could make a robot system more practical and flexible. The contributions described in the accompanying scientific paper can be summarized as:
  Using off the shelf barometric MEMS devices, we present construction and integration of a low-cost and low resolution tactile sensor array for robotic grasping and manipulation.
  We introduce a meaningful 3D representation for local geometry of objects using the proposed low-resolution tactile sensing.
  We propose an unsupervised machine learning approach for classifying novel objects, which fits a model to tactile representations acquired with interactive manipulation, without the need for pre-training and labeled ground truths across an entire training set of objects.

FIG. 1 shows the experimental setup for our interactive tactile-based classification and recognition. A 7-DoF (Degrees of Freedom) robot arm, with attached parallel jaw gripper equipped with barometric tactile sensors (zoomed-in insert).

Figure 2:
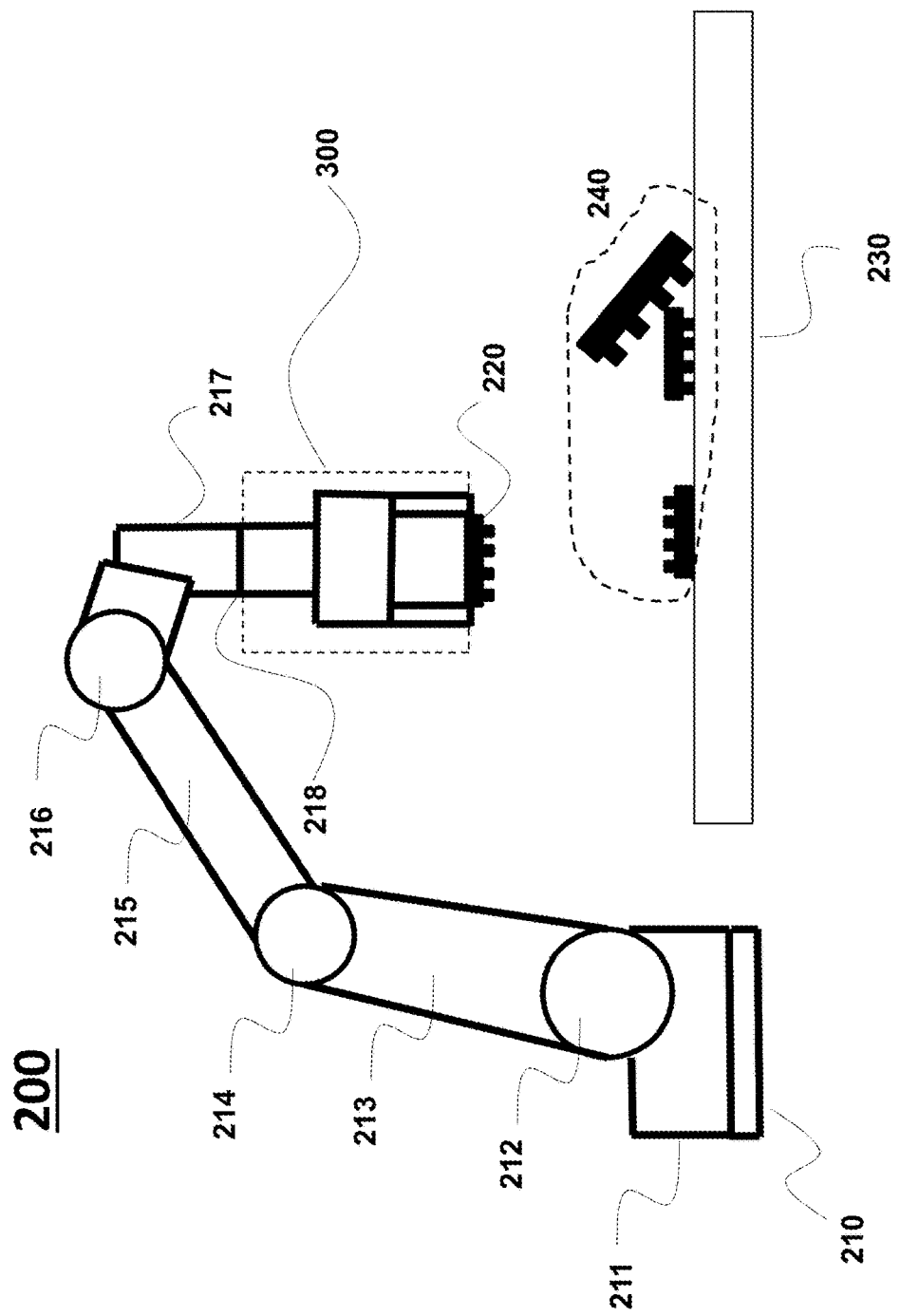
FIG. 2 is a diagram illustrating an example of a robot used in the preferred embodiment.

FIG. 2 is a diagram illustrating an example of a robot used in the preferred embodiment. The robot arm 200 consists of a set of rigid links 211, 213, 215, 217, connected to each other by a set of joints 210, 212, 214, 216, 218. In the described embodiment, the joints 210, 212, 214, 216, 218 are revolutionary joints, but in another embodiment, they can be sliding joints, or other types of joints. The collection of joints determines the degrees of freedom for the robot arm 200. The robot arm 200 has five degrees of freedom, one for each joint 210, 212, 214, 216, 218. The joints have embedded sensors, which can report the state of the joint. The reported state may be the angle, the current, the velocity, the torque, the acceleration or any combination thereof. The robot arm 200 has a gripper 300 attached. The gripper 300 is described in detail with the description of FIG. 3A. The robot arm 200 and gripper 300 can grasp and manipulate objects 220. The objects are usually positioned on a work surface 230. A collection of objects 240 may be present on the work surface. The objects may differ in shape, size or both. The objects may be separated or stacked on top of each other. When the collection of objects 240 is not separated according to some separation method, the collection of objects 240 is referred to as being cluttered. The robot arm 200 is often also referred to as a manipulator arm.

Figure 3A:
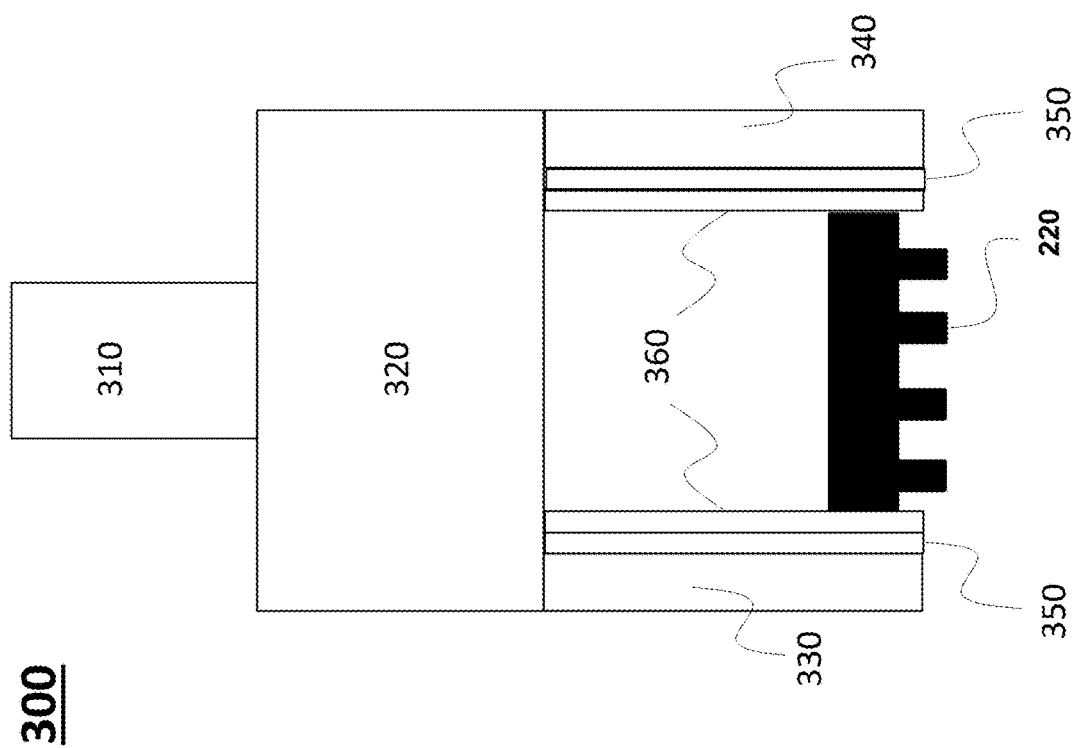
FIG. 3A is a diagram illustrating an example of a two-fingered robotic gripper.

FIG. 3A shows an example of a two-fingered robotic gripper 300. The robotic gripper 300 has an attachment 310 to attach the gripper to a robot arm 200. The attachment 310 typically routes power, control and sensor cabling to and from the gripper housing 320, fingers 330, 340 and tactile sensors 360. The robotic gripper 300 further consists of a motor and housing 320 to control a left finger 330 and a right finger 340. In the preferred embodiment the motors control the slide of the fingers 330 and 340. By sliding the fingers towards each other, the gripper is said to close to grasp an object 220. By sliding the fingers away from each other, the gripper is said to open and release the object 220 from its grasp. In one embodiment the left finger 330 may be the same as the right finger 340. In another embodiment the fingers might be different in size, shape and actuation, or any combination thereof. In the preferred embodiment we attach elastic polymer 350 to the fingers 330 and 340. Tactile sensors 360 are attached to the elastic polymer 350. It is understood that a two-fingered robotic gripper is only one example of gripper in the preferred embodiment. Another embodiment may use a 3-finger actuated gripper. Yet another embodiment might be using a 5-finger fully actuated hand. It is understood that the tactile sensors can be attached to the fingers and other parts of grippers in other embodiments.

Figure 3B:
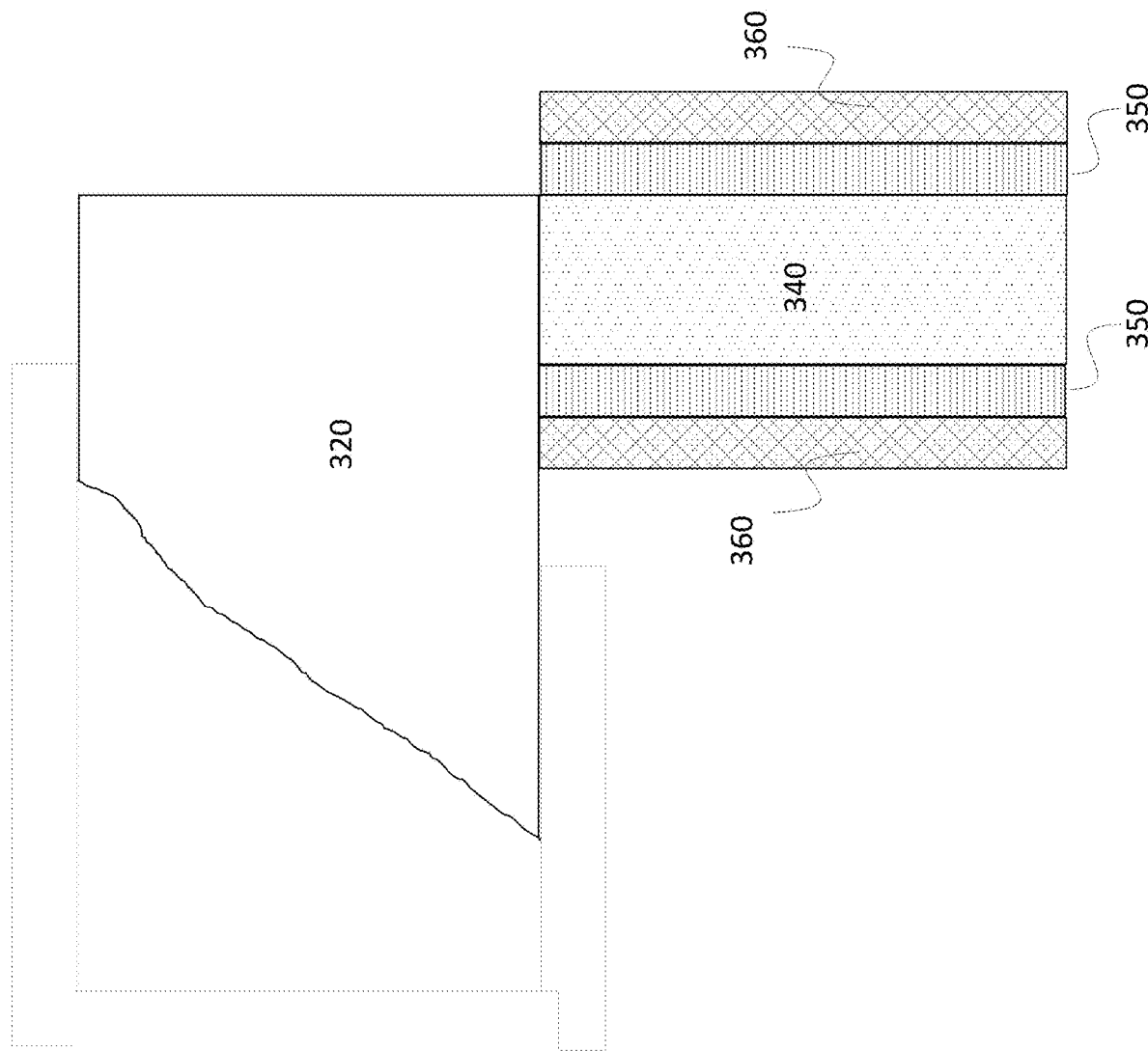
FIG. 3B shows a close-up of a right finger of a robot gripper, with part of the gripper housing.

FIG. 3B shows a close-up of a right finger 340 of a robot gripper 300, with part of the gripper housing 320. In this embodiment, the elastic polymer 350 is attached on both sides of the finger 340. Also, the tactile sensors 360 are attached to the elastic polymer 350 on both sides of the finger 340.

Figure 4:
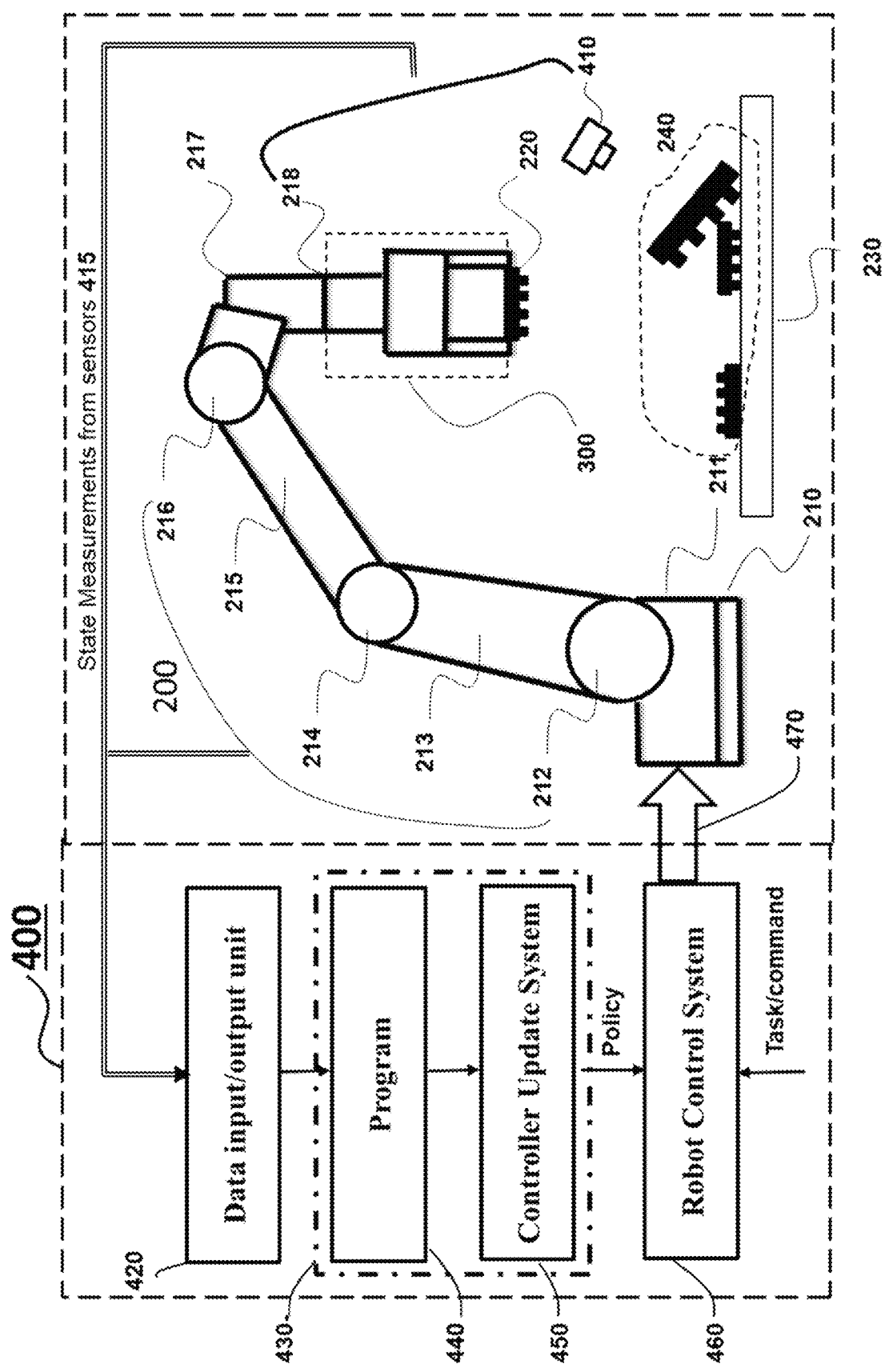
FIG. 4 is a diagram illustrating an example of a system using a robot arm.

FIG. 4 is a diagram illustrating an example of a control system using a robot arm. In the following, the control system is described as an example that are applied to a robotic system 400, however it should be noted that a control system and a computer-implemented method according to the present invention are not limited to the robotic systems. The robot arm 200 is controlled using a robot control system 400 that receives a command or task that may be externally supplied to the system 460. An example of the command or task could be touching or grasping an object 220 using grippers 300 of the robot arm. The robot control system 460 sends a control signal 470 to the manipulator. The control signal 470 could be the torques to be applied at each of the joints 210, 212, 214, 216, 218 of the robot arm, and opening/closing of the gripper 300. The state of the robotic system 415 is derived using sensors. These sensors may include encoders at the joints of the robot 210, 212, 214, 216, 218, and a camera 410 that can observe the environment of the robot and tactile sensors 360 that can be attached to the fingers 330, 340 of the gripper 300. The state measurements from sensors 415 are sent to a data input/output unit 420 which stores the data received from the sensors. The robot control system 460 is said to execute a policy 430 to achieve some task or command. A program 440 takes the input from data input/output unit 420 to determine an update to the control policy using a controller update system 450. The controller update system 450 then sends the updated policy 430 to the robot control system 460. The policy 430 and robot control system 460 can also control the amount of opening or closing of the gripper finger 330 and 340. The amount of closing, or strength of the grasp, can be determined by the control policy 430. In the preferred embodiment the grasp strength is determined from the tactile sensor 360 signals, which are part of the state measurements from sensors 415.

In the preferred embodiment the camera 410 is an RGBD camera which can supply both an RGB color image and a depth image. The internal information from the RGBD camera can be used to convert the depth into a 3D point cloud. In another embodiment the camera can be a stereo camera, consisting of two color cameras for which depth and 3D point cloud can be computed. In yet another embodiment the camera can be a single RGB camera, and 3D point cloud can be estimated directly using machine learning. In another embodiment, there could be more than one camera 410. Finally, in another embodiment the camera 410 can be attached at some point on the robot arm 200, or gripper 300.

Tactile Sensing Hardware and Data Generation

Figure 5:
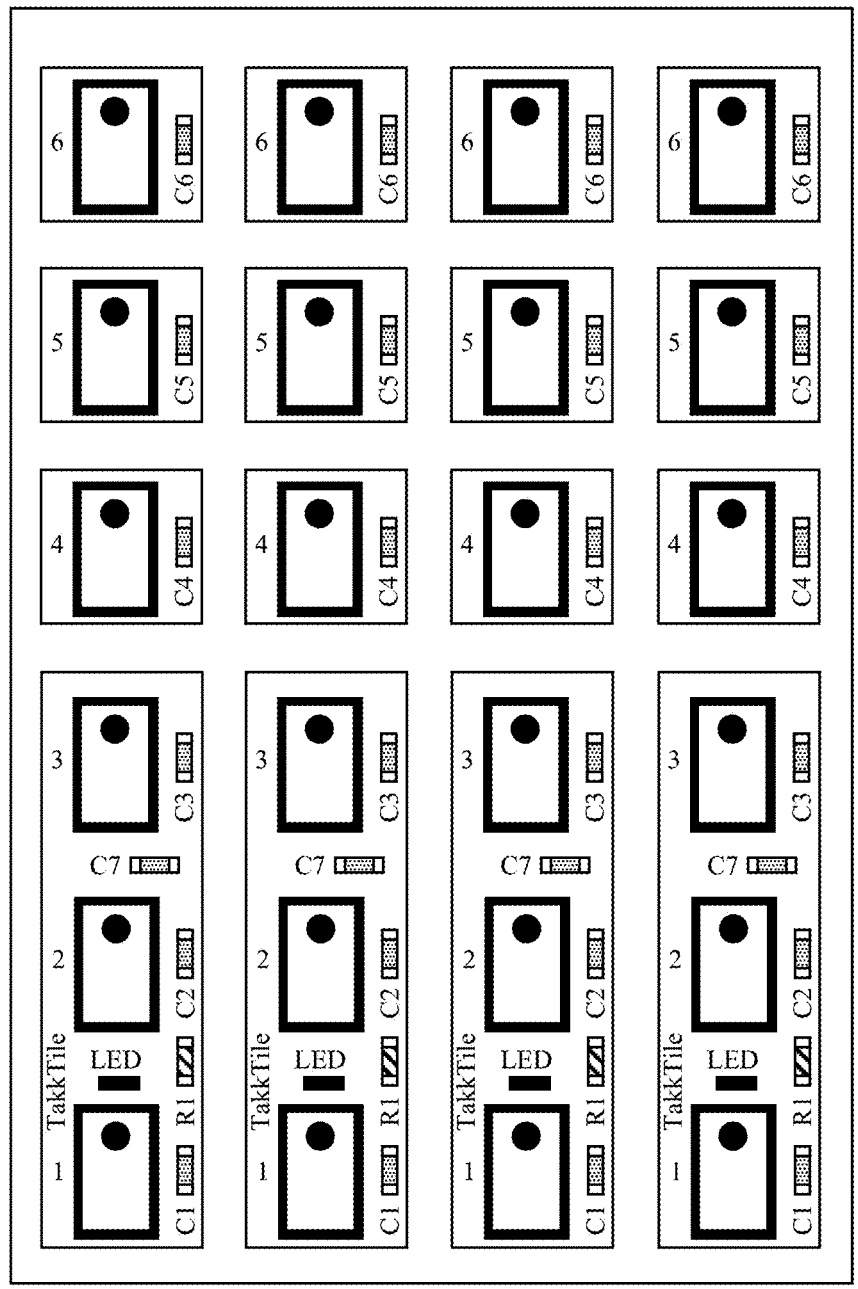
FIG. 5 shows an example layout of tactile sensors.

FIG. 5 shows an example layout of tactile sensors. In the preferred embodiment, our tactile sensing hardware 360 consists of four tightly packed arrays of Takktile sensor strips, arranged as the inside and outside touch pads of a two-finger parallel jaw gripper. In this embodiment, the array consists of four TakkStrip2 devices (RightHand Robotics, Inc.) connected to a main $I^2C$ bus. Our tactile arrays consist of 48 taxels arranged in a 4×6 array, with a dot pitch of roughly 7.5 mm. It should be noted that the sizes and the array used in the embodiment are not limited. The geometry, the sensor and the number sensors per array can be modified according to the design of a gripper 300.

The Takktile sensors use a series of MEMS barometric $I^2C$ devices casted in a soft elastomer and packaged as strips of six taxels (tactile sensor cells). The main benefit of these devices is that they provide all the analog signal conditioning, temperature compensation and analog to digital conversion (ADC), on chip. As opposed to other tactile sensing technologies, barometric sensors read the tactile pressure and temperature input directly, and are thus more akin to human touch sensing. Moreover, compared with vision-based touch sensing alternatives, MEMS pressure sensors communicate over a significantly lower bandwidth while allowing for a more flexible spatial arrangement of the taxels (i.e. not bounded to planar touch pads).

Each gripper finger 330, 340 is fitted with eight Takktile strips, divided into two groups: one for exterior grasps and the other for interior grasps, totaling a number of 48 taxels per finger. For convenience, the touch pads are planar, although this is not a design limitation. In fact, each sensor cell can be isolated and addressed with minimal hardware changes, while the device footprint can be further reduced by using equivalent MEMS barometric devices. The current iteration of the touch sensing array used in our experiments measures 30 45 mm and contains 4 6 taxels (thus a dot pitch of 7.5 mm).

All devices communicate over a single I²C standard bus. Data collision and other transfer safeties are handled "on-strip" by a traffic controller that, when addressed by a master I²C controller, wakes each connected device in a loop which triggers it to load the pressure data on the bus (detailed information about the Takktile's communication protocol can be found in). Using a I²C-USB device interface, the sensors are connected to a Raspberry Pi 4 acting as a physical ROS node which publishes raw tactile data to our ROS-enabled robot controller. With this setup we achieve a 64 Hz sampling rate with all 96 taxels connected.

It should be noted that although these barometric pressure sensors are the preferred embodiment for our tactile sensing hardware, the tactile sensing instrumentation is not limited to barometric pressure arrays and extends to piezoelectric devices, capacitive devices and fiduciary devices, including image-based tactile sensing.

Tactile-Based Interactive Classification and Recognition

Figure 6:
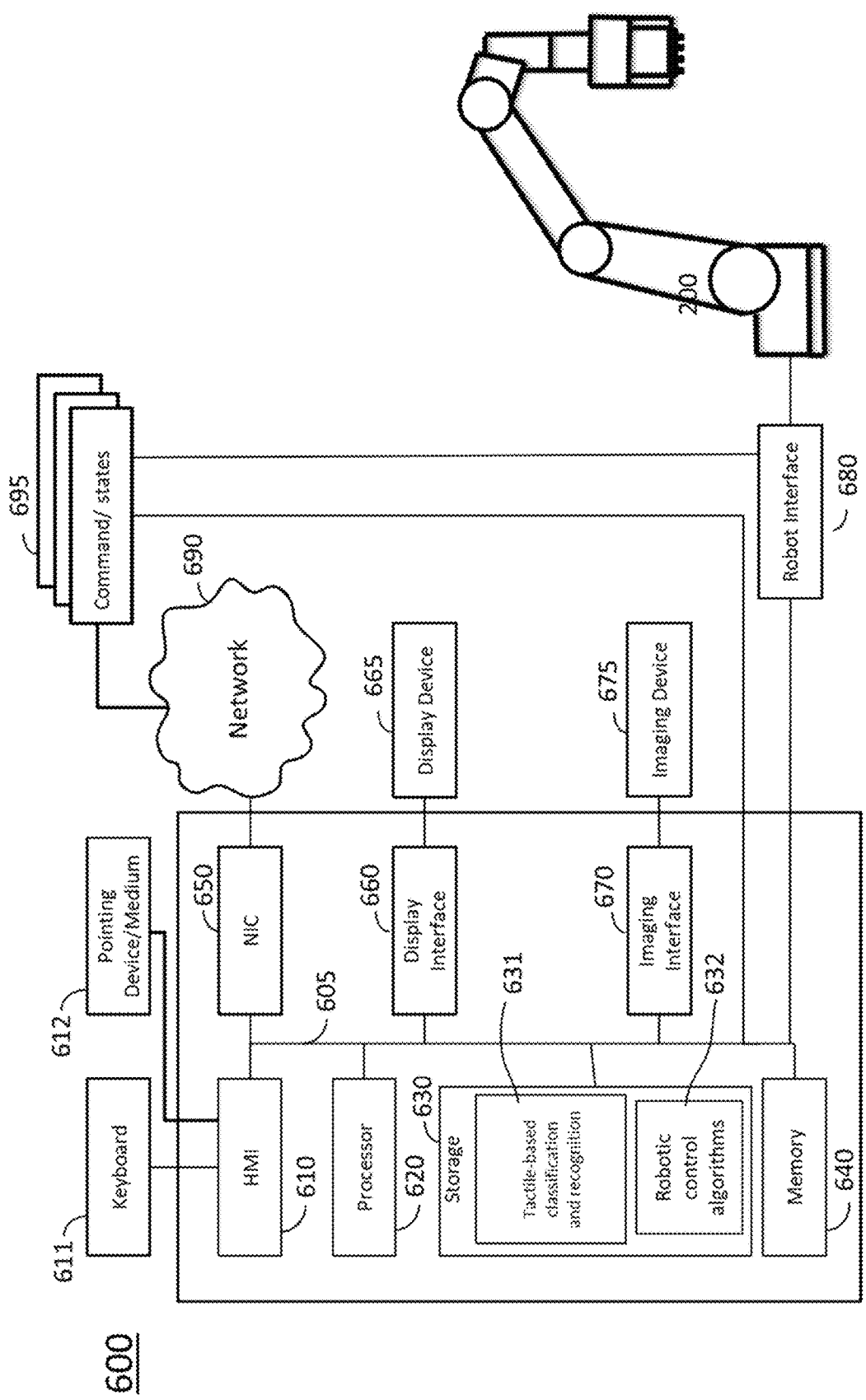
FIG. 6 shows a block diagram of the tactile-based interactive classification and recognition system according to some embodiments.

FIG. 6 shows a block diagram of the tactile-based interactive classification and recognition system according to some embodiments. The tactile-based interactive classification and recognition system 600 is configured to produce tactile features to classify objects as seen/known or unseen/unknown, or recognize an object, i.e., what object category it belongs too, in accordance with some embodiments. We refer to the terms seen or known, and unseen or unknown to indicate whether the system has previously interacted with the object. The system 600 includes a processor 620 configured to execute stored instructions, as well as a memory 640 that stores instructions that are executable by the processor. The processor 620 can be a single core processor, a multi-core processor, a computing cluster, or any number of other configurations. The memory 640 can include random access memory (RAM), read only memory (ROM), flash memory, or any other suitable memory systems. The processor 620 is connected through a bus 605 to one or more input and output devices.

The system 600 is configured to perform tactile feature computation and classify or recognize objects that are manipulated by a robot arm 200. The system 600 can include a storage device 630 adapted to store a tactile-based classification and recognition 631 and robotic control algorithms 632. The storage device 630 can be implemented using a hard drive, an optical drive, a thumb-drive, an array of drives, or any combinations thereof.

A human machine interface 610 within the tactile-based interactive classification and recognition system 600 can connect the system to a keyboard 611 and pointing device 612, wherein the pointing device 612 can include a mouse, trackball, touchpad, joystick, pointing stick, stylus, or touch-screen, among others. The system 600 can be linked through the bus 605 to a display interface 660 adapted to connect the system 600 to a display device 665, wherein the display device 665 can include a computer monitor, camera, television, projector, or mobile device, among others.

The tactile-based interactive classification and recognition system 600 can also be connected to an imaging interface 670 adapted to connect the system to an imaging device 675 which provides RGBD images. In one embodiment, the images for tactile feature computation are received from the imaging device. In another embodiment, the imaging device 675 can include a depth camera, thermal camera, RGB camera, computer, scanner, mobile device, webcam, or any combination thereof.

A network interface controller 650 is adapted to connect the tactile-based interactive classification and recognition system 600 through the bus 605 to a network 690. Through the network 690, robot states can be received via the commands/state module 695 and via the bus 605 stored within the computer's storage system 630 for storage and/or further processing. Through the network 690, commands can be transmitted via the commands/state module 695 to a robot arm 200. In another embodiment, commands are transmitted via the bus 605.

In some embodiments, the tactile-based interactive classification and recognition system 600 is connected to a robot interface 680 through the bus 605 adapted to connect the tactile-based interactive classification and recognition system 600 to a robot arm 200 that can operate based on commands derived from the robotic control algorithms 632 and the received robot states 695. For example, the robot arm 200 is a system which performs the execution of a policy to interact with an object. In another embodiment, the robot interface 680 is connected via the command/states module 695 to the network 690.

The main objective of the proposed system is to control the robot arm and gripper to grasp an object on a work surface, and subsequently record the tactile signals for the grasp. The tactile signals are processed and used for classification and recognition. The robot arm and gripper are commanded to grasp objects multiple times, under different grasp poses. The tactile signals for different grasp poses are different from each other.

Figure 7:
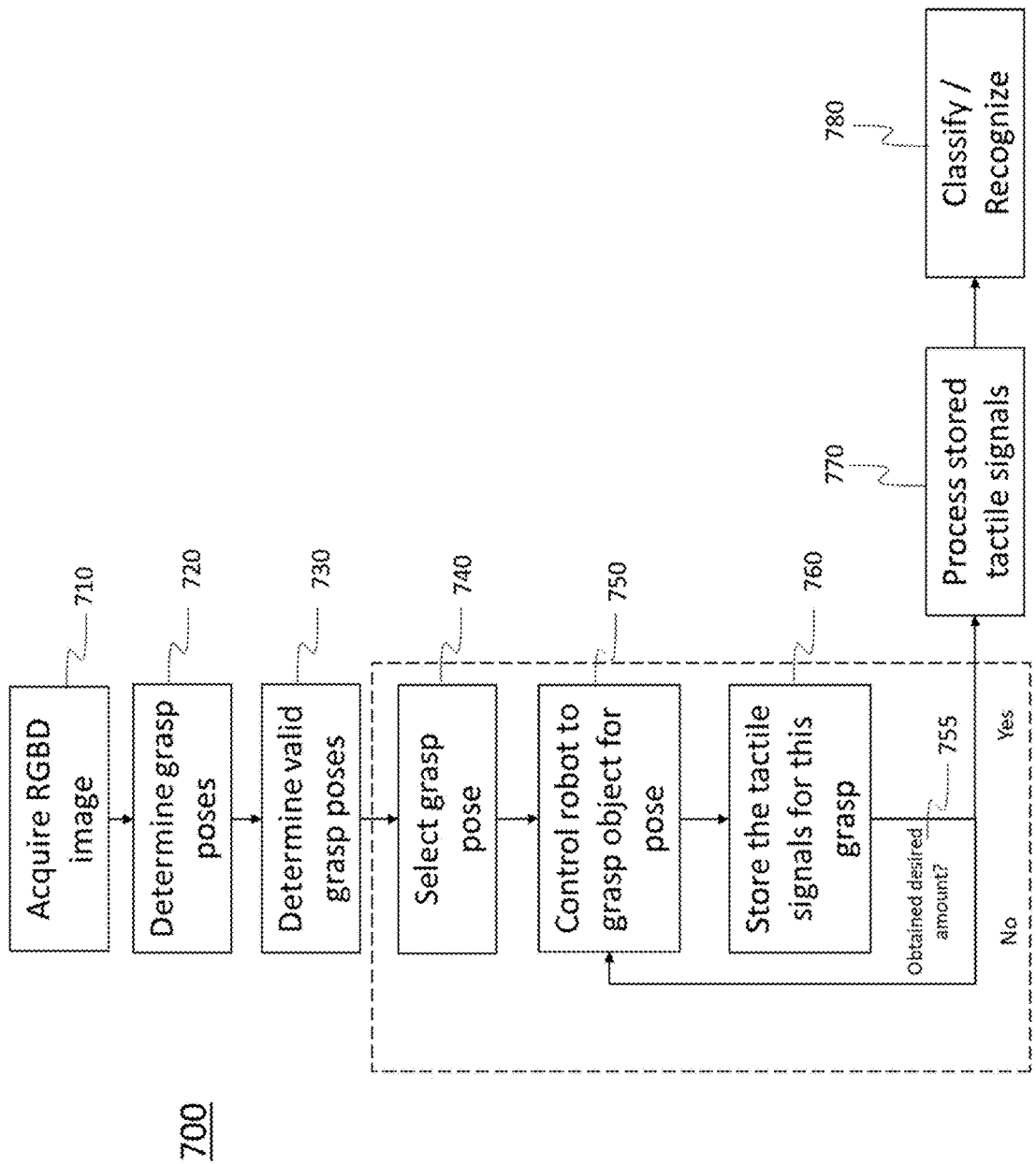
FIG. 7 shows a block diagram of tactile-based classification and recognition process.

FIG. 7 shows a block diagram of tactile-based classification and recognition process. The process to classify or recognize objects 700 starts by acquiring an RGBD image 710 with an RGBD camera 410. The RGBD image 710 is processed by a grasp pose detection algorithm to determine candidate grasp poses 720. The candidate grasp poses 720 may contain grasp poses which cannot be obtained with the robot arm 200 and gripper 300. From the candidate grasp poses 720 a set of valid grasp poses 730 are determined. An example of invalid grasp poses are those for which the robot arm 200 and/or gripper 300 would collide with itself or the work surface 230. Other invalid grasp poses are those for which the inverse kinematics computation cannot find a solution. In addition, due to constraints on the robot's range of motion, some grasp poses cannot be obtained by the robot and gripper, and are therefore invalid. Another example of invalid grasp poses are those for which the grasp might be stable, according to some metric.

For one such grasp pose selected 740 from the valid grasp poses 730, the robot is controlled 750 to grasp the object under the selected grasp pose 740. In the preferred embodiment the robot is a robot arm 200 with attached gripper 300 and tactile sensors 360. When the object is grasped, the tactile signals are recorded 760. If desired number of valid grasp poses 730 have not been processed, decided by checking a desired amount 755, the process repeats selecting a grasp pose 740 from the valid grasp poses 730, and use robot control 750 to grasp the object under the next selected grasp pose, and store the tactile signals 760. Once the desired number of grasp poses and tactile signals has been obtained, the check for desired amount 755 will direct the processing to process the stored tactile signals 770 for all candidate grasps. The processed tactile signals 770 are then used to classify or recognize 780 the object that the robot arm 200 is interacting with.

Figures 8A, 8B, 8C:
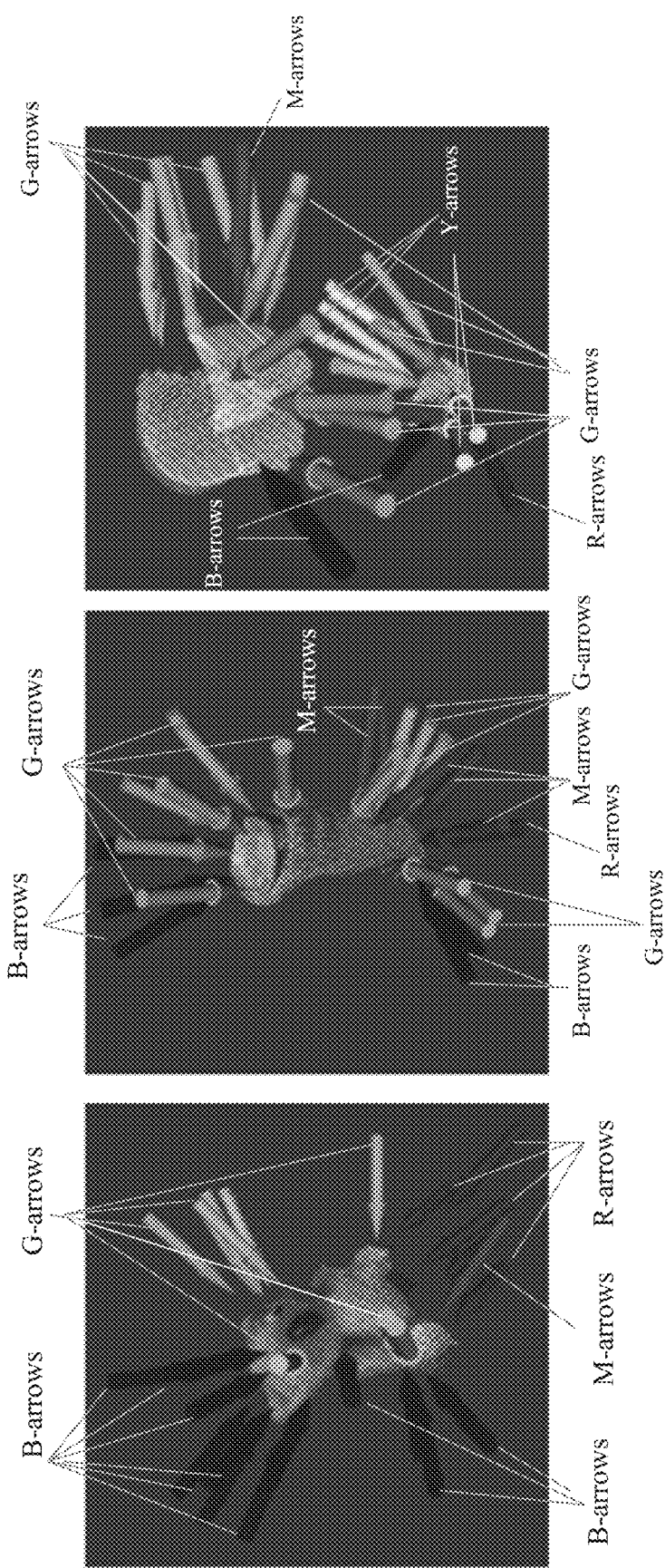
FIG. 8A shows an example of candidate grasp poses, colored according to some metrics.
FIG. 8B shows an example of candidate grasp poses, colored according to some graspability metric.
FIG. 8C shows an example of candidate grasp poses, colored according to some graspability metric.

FIGS. 8A, 8B and 8C show examples of candidate grasp poses, colored according to some metrics. FIG. 8A shows the candidate grasp poses for a plush toy object. Red arrows represent poses that are eliminated due to collisions of the robot arm with the work surface, which is determined by the robot control algorithms 632. The robot control algorithms 632 further determine that the approach angle of the robot is not feasible, marked as blue or magenta. The yellow arrows denote candidate poses for which no valid inverse kinematics could be computed by the robot control algorithms 632. Finally, the remaining valid grasp poses are marked by green arrows. The grasp poses which the robot arm will execute are selected from a normal distribution of the valid grasp poses. In another embodiment, the grasp poses selected for the robot arm can be determined according to some desired coverage of the objects' surface. FIGS. 8B and 8C show additional examples for other objects.

Raw Signal Processing

Figure 9:
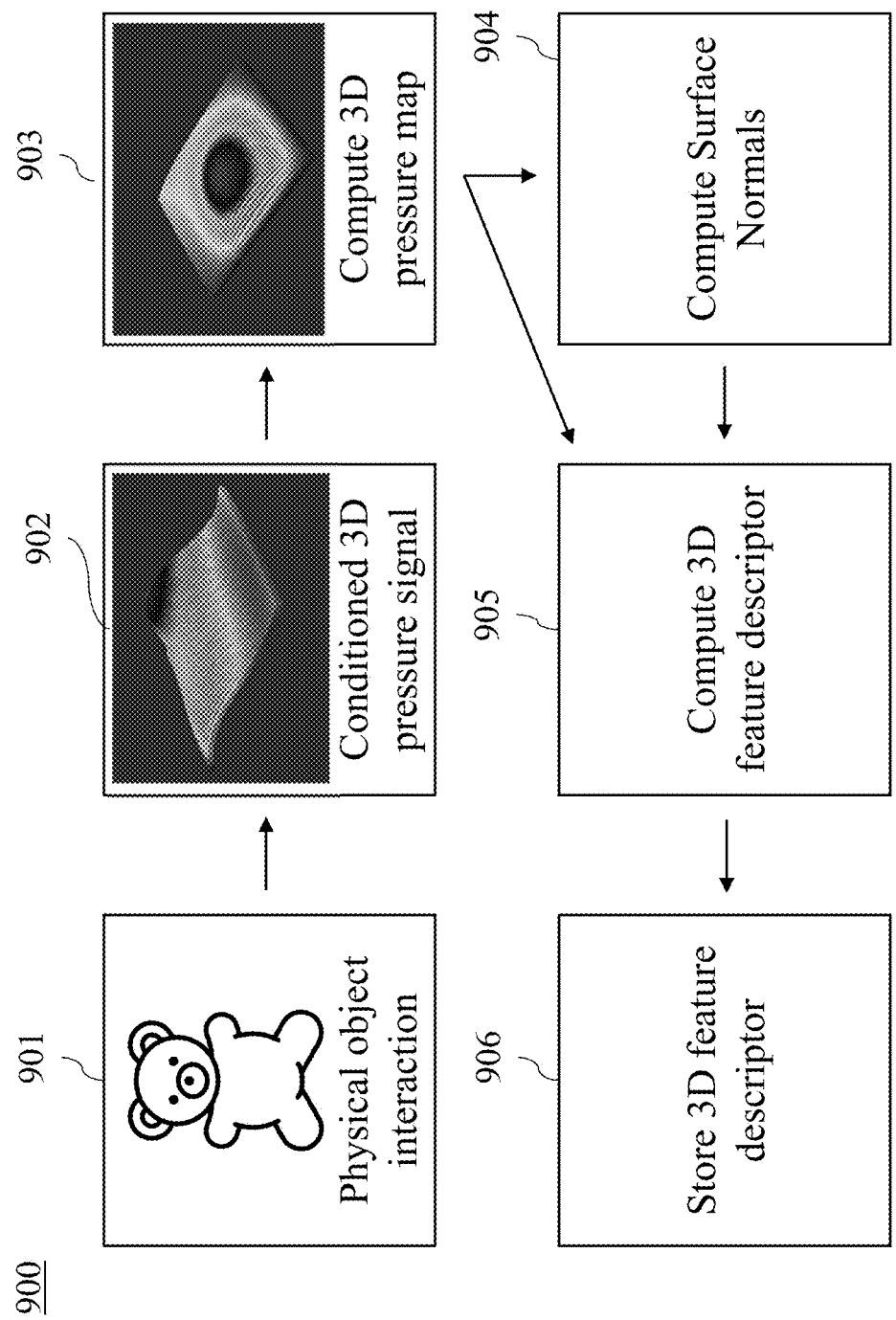
FIG. 9 shows a block diagram of the tactile feature computation process.

FIG. 9 illustrates our tactile sensing processing pipeline. The robot control to grasp an object for a selected pose 740 provides us with tactile signal for the grasp of the object under consideration, encapsulated in block 901. The tactile raw data in the preferred embodiment consists of an array of 96 pressure and temperature values, corresponding to each taxel. As a first processing step, the individual pressure values are temperature compensated as stated in the sensor manufacturer's datasheet. Despite a relatively low noise (0.01 N) and good linearity (less than 1% typ.) the barometer cells exhibit a slow drift after a few hours of use. To compensate for the noise drift, we use a simple moving average filter with an arbitrarily chosen window of 30 samples and uniform weight across all data points. This filter doubles as a measure of the unloaded sensor state. Though not a requirement of our tactile sensing pipeline, we offset the measured steady state for each taxel (given by the moving average filter), so that our filtered readout reflects only tactile load and temperature information. In FIG. 9, this 3D signal conditioning is encapsulated in block 902.

Generating the Pressure Maps

An initial goal of this paper consists of generating a meaningful 3D representation of the objects' local geometry using a low-resolution tactile device. To achieve this we represent the contact between the touch pad and the manipulated object as a continuous 3D pressure map. We generate this pressure map 903 by uniformly sampling a Non-rational Uniform B-spline (NURBS) surface patch, where each node $P_{ij}$ in the control net (represented as a quadrilateral mesh), is computed from a linear combination of taxels' location in the 3D space $x_{T_{ij}}$, and their respective filtered pressure reading, expressed as a displacement on the z-axis in the spline's reference frame:

$$p_{ij} = x_{T_{ij}} + k[0\ 0\ P_{ij}^f]^T \quad (1)$$

where k is an arbitrary scaling constant which controls the surface's z-range, and $T_{ij}$ is the taxel at grid location $\{i,j\}$ with its corresponding filtered pressure value $P_{ij}^f$. We uniformly evaluate the NURBS surface using the well known formulation:

$$S(u, v) = \frac{\sum_{i=0}^{n}\sum_{j=0}^{m} N_{ip}(u)N_{jq}(v)w_{ij}p_{ij}}{\sum_{i=0}^{n}\sum_{j=0}^{m} N_{ip}(u)N_{jq}(v)w_{ij}} \quad (2)$$

where $N_{ip}$ and $N_{jq}$ are B-spline basis functions and the degree of each NURBS curve generator (n and m, respectively) is the number of control points less one, along each parametric coordinate (i.e. no internal knots in the two knot vectors). The weight is kept at $w_{ij}=1$ for all control points. The surface is uniformly sampled by sweeping the normalized parametric domain $\{u,v\}=[0,1]\times[0,1]$ with a constant parameter increment du, and respectively dv, calculated based on a user-defined resolution and the aspect ratio of the NURBS control mesh. In our testing we used a surface sampling resolution of 2166 and an aspect ratio of 2/3.

FIGS. 8A, 8B and 8C show examples of candidate grasp poses, colored according to some metrics. FIG. 8A shows the candidate grasp poses for a plush toy object. R-arrows represent poses that are eliminated due to collisions of the robot arm with the work surface, which is determined by the robot control algorithms 632. The robot control algorithms 632 further determine that the approach angle of the robot is not feasible, marked as B-arrows or M-arrows. Y-arrows denote candidate poses for which no valid inverse kinematics could be computed by the robot control algorithms 632. Finally, the remaining valid grasp poses are marked by G-arrows. The grasp poses which the robot arm will execute are selected from a normal distribution of the valid grasp poses. In another embodiment, the grasp poses selected for the robot arm can be determined according to some desired coverage of the objects' surface. FIGS. 8B and 8C show additional examples for other objects.

Next we compute 3D surface descriptors 905 from 3D pressure maps 903 and associated surface normals 904. The 3D surface descriptor is a Viewpoint Feature Histogram (VFH). Each VFH is a 308-dimensional feature vector. We compute one for each finger of the gripper, and store a grasp as a combination of two VFHs, a 616-dimensional feature vector. The 3D surface descriptors 905 are flattened into vectors and stored 906 to disk or memory.

Interactive Tactile Classification of Novel Objects

Our goal is to use tactile feedback to classify objects as unseen or seen before. In recent years, DNNs have achieved good performance on various classification tasks. The networks are trained with supervisory signals, i.e. ground truth class labels, and thus fall under the umbrella of supervised learning methods. In addition, DNNs require copious amounts of training data to achieve good performance. Due to these requirements, using DNNs is not a practical solution to achieve our goal.

We instead propose to learn online, one object at a time, without any need for pre-training. Object instances that have been manipulated before by the robot should be classified as such, and novel objects should be detected, learned, classified and added to the set of previously manipulated objects. The main motivation behind our approach is data efficiency and active exploration. For a practical manipulation task, a real robotic system can only "afford" a short amount of time to determine if the object is novel, which implies too few tactile samples for deep learning. Moreover, knowing the span of object geometry and material properties, i.e., the range of tactile feel, beforehand, defeats the purpose of a generic tactile manipulation framework, and would simply fall into the usual robotic pick-and-place in a structured environment.

Learning Local Tactile Representations for Novel Objects

Figures 10A, 10B:
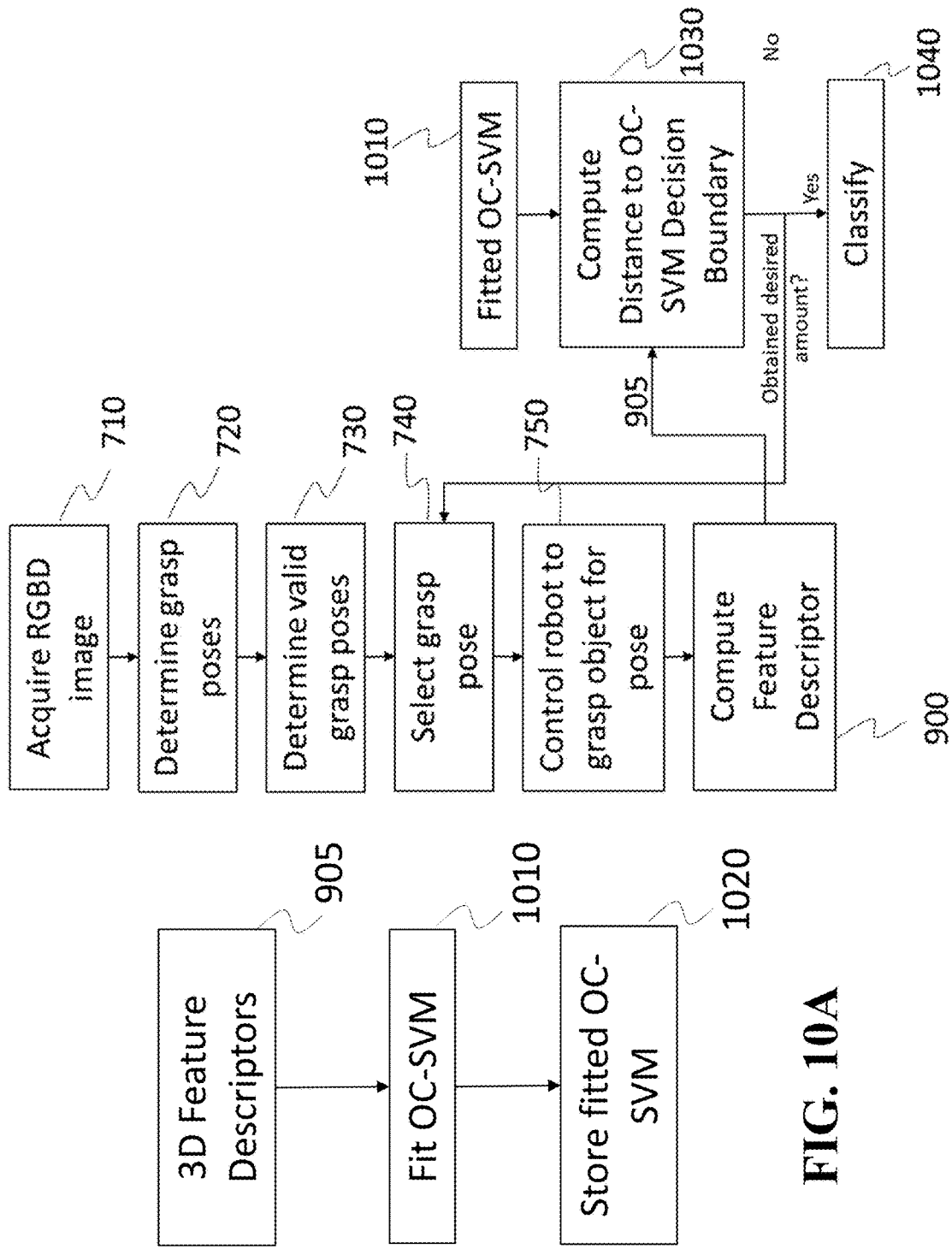
FIG. 10A shows a diagram of the One-Class classification fitting and storage process in training.
FIG. 10B shows a diagram of the process to manipulate an object with tactile sensors and utilize the One-Class classification in operation.
Figure 11:
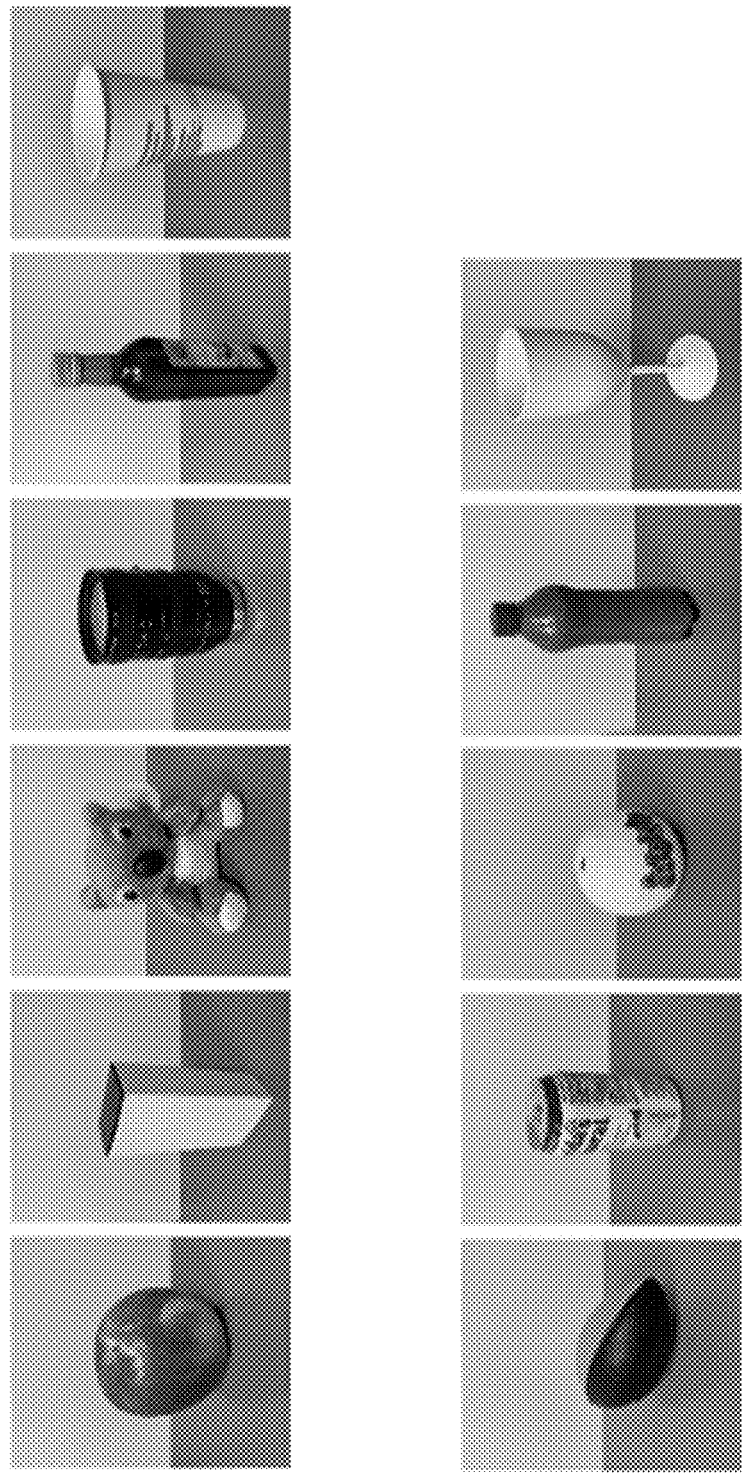
FIG. 11 shows a gallery of objects that were manipulated during evaluation of our system in operation.

As stated above, we want to avoid pre-training on objects, and handle objects as they are manipulated by the robot. Furthermore, we want to eliminate the need for known object labels which are required in supervised learning methods. We proposed embodiment use an unsupervised learning approach based on One-Class Classification (OCC). OCC aims to learn a representation for the grasps, and then classify seen (known) vs. unseen (unknown) objects. We choose the One-Class SVM (OC-SVM) classifier, which can be formulated as:

$$\min_{w,\xi_i,\rho} \frac{1}{2}\|w\|^2 + \frac{1}{vn}\sum_{i=1}^{n}\xi_i - \rho \quad (3)$$

$$s.t. (w \cdot \phi(x_i)) \geq \rho - \xi_i \quad \text{forall } i = 1, \ldots, n$$

$$\xi_i \geq 0 \quad \text{forall } i = 1, \ldots, n$$

where, $\xi_i$ is the slack variable for sample i, n is the size of training samples and V is the regularization parameter. The SVM hyperplane is represented by w and $\rho$. Points on one side of this hyperplane are classified as inliers, and points on the other side as outliers. FIG. 10A shows a diagram of the One-Class classification fitting and storage process in training. For a first, and thus previously unseen, object to system, we consider the 3D Feature Descriptors 905 for all n=$n_g$ grasps simultaneously, and fit the OC-SVM 1010 to this data. We then store this OC-SVM 1020 as a representation for the object.

Classifying Objects

Using the OC-SVM representation, we classify an object by evaluating the decision function, defined as:

$$f(x) = \text{sgn}((w \cdot \phi(x_i)) - \rho) \quad (4)$$

$$= \text{sgn}\left(\sum_{i=1}^{n} \alpha_i K(x, x_i) - \rho\right),$$

where $\alpha_i K(x,x_i)$ is $w \cdot \phi(x_i)$ expressed with a kernel function K. We use an RBF kernel function for all experiments in this work. Each value within the sgn( ) represents a signed distance to the hyperplane. Positive distances represent inliers, while negative distances represent outliers.

Novel Object Discovery

FIG. 10B shows a diagram of the process to manipulate an object with tactile sensors, and utilize the One-Class Classification in operation. The process to classify or recognize objects 700 starts by acquiring an RGBD image 710 with an RGBD camera 410. The RGBD image 710 is processed by a grasp pose detection algorithm to determine candidate grasp poses 720. From the candidate grasp poses 720 a set of valid grasp poses 730 are determined. For one such pose selected 740 from the valid grasp poses 730, the robot is controlled 750 to grasp the object under the determined grasp pose, using the robot arm 200 with attached gripper 300 and tactile sensors 360. Using the fitted OC-SVM 1010 we can compute the decision function from Eq. 4 for each of the 3D Feature Descriptors 905 corresponding to the $n_g$ grasps, and determine for each whether they are inlier or outlier. However, this ignores the signed distances $\alpha_i K(x,x_i)-\rho$ 1030 to the decision boundary. Instead, we compute the mean over the $n_g$ signed distances corresponding to the grasps. The final classification 1040 of the object as inlier (seen/known) or outlier (unseen/unknown) is then based on the mean signed distance. We repeat this process with OC-SVM for each previously manipulated object type, for which we have stored fitted OC-SVM 1020.

If the classification 1040 classifies the object as unseen/unknown, the earlier process of OC-SVM fitting is repeated. For the current object, we consider the 3D Feature Descriptors 905 for all grasps simultaneously, and fit the OC-SVM 1010 to this data. We then store this OC-SVM 1020 as a representation for this current object. This process is repeated for each object which is classified 1040 as unseen/unknown.

Sampling Grasps for Objects

In our proposed embodiment we rely on vision only to determine grasp candidates for objects that the robot interacts with. The robot has an on-board RGBD camera which provides a 3D point cloud of the scene. There exists a number of approaches to autonomously generate robotic grasps on objects. In this work, we use grasp pose detection (GPD) to propose a set of possible autonomy grasps. GPD can directly operate on point clouds and can provide a ranked set of potential grasp candidates. The grasps are filtered to avoid collisions of the robot with the environment. We select $n_g$ grasps from the proposed set of grasps for an object, according to filtered grasp directions.

The tactile features on the selected grasps should essentially form some sort of basis when fitting the OC-SVM. The more we can uniformly sample an object across its surface, the more likely the model can classify it correctly. In the next section, we present the evaluation of our proposed method in two experiments.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A controller for interactive classification and recognition of an object in a scene using tactile feedback, comprising:

an interface configured to transmit and receive the control signals and sensor signals from a robot arm, gripper signals from a gripper attached to the robot arm, tactile signals from sensors attached to the gripper and at least one vision sensor;

a memory module to store robot control programs, and a classifier and recognition model; and a processor configured to generate control signals based on the control program and a grasp pose on the object, and configured to control the robot arm to grasp the object with the gripper, and wherein the processor is further configured to:

compute a tactile feature representation from the tactile sensor signals, wherein the processor is configured to repeat gripping the object and computing a tactile feature representation with the set of grasp poses, after which the processor, wherein tactile feature descriptors are based on a 3D representation for local geometry of the object, wherein the tactile feature descriptors are 3D tactile feature descriptors based on the 3D representation for the local geometry of the object, wherein the 3D tactile feature descriptor is computed as:

generating a 3D pressure map based from the tactile sensor signals;

computing surface normals from the 3D pressure maps; and computing a 3D tactile feature descriptor from the 3D pressure maps and surface normals;

and processes the ensemble of tactile features to learn a model which is utilized to classify or recognize the object as known or unknown.

2. The controller of claim 1, wherein the grasp poses on the object are computed from at least one vision signal of the at least one vision sensor.

3. The controller of claim 1, wherein the processing of the ensemble of tactile feature descriptors for classification is performed with machine learning.

4. The controller of claim 3, wherein a model of the machine learning is One-Class Support Vector Machine.

5. The controller of claim 3, wherein a model of the machine learning is used to classify an instance of the object.

6. The controller of claim 3, wherein a model of the machine learning is used to recognize an instance of the object.

7. The controller of claim 5, wherein a model of the machine learning is used to classify an instance of the object as previously seen before or unseen.

8. The controller of claim 7, wherein a machine learning model is updated for an instance of the object classified as unseen.

9. The controller from claim 1, where in the 3D pressure map is computed by use of a spline surface patch method.

10. The controller of claim 1, wherein the tactile sensor attached to the gripper includes an array of tactile sensor cells.

11. The controller of claim 1, wherein the tactile sensor attached to the gripper includes a high-resolution camera-based tactile device.

12. The controller of claim 10, wherein the tactile sensor cells are barometric Micro Electro-Mechanical System devices.

13. The controller of claim 1, wherein a soft elastomer is attached to the grippers, and the tactile sensor attached is disposed in the soft elastomer.

14. The controller of claim 1, wherein the sensors are configured to perform temperature compensation and analog to digital signal conversion.

15. The controller of claim 1, wherein the sensors measure tactile pressures when touching the object.

16. The controller of claim 1, wherein the sensors are configured to be flexible to be arranged on non-planar surfaces.

17. The controller of claim 10, wherein the sensors arrays instrument any surface of the robotic grippers' fingers.

18. The controller of claim 1, wherein the interface is a single serial I2C standard communication bus.

19. The controller of claim 2, wherein a subset of the grasp poses is selected to control the robot arm.

20. The controller of claim 19, wherein a subset of the grasp poses is selected according to draws from a uniform distribution created from the set of the grasp poses.

21. The controller of claim 19, wherein a subset of the grasp poses is selected according to a metric of surface coverage of the object.

* * * * *